(12) United States Patent
Conrad

(10) Patent No.: US 7,171,913 B1
(45) Date of Patent: Feb. 6, 2007

(54) SELF-CALIBRATING METER WITH IN-METER DIFFUSER

(75) Inventor: Larry Conrad, Delta, IA (US)

(73) Assignee: AMVAC Chemical Corporation, Newport Beach, CA (US)

( * ) Notice: Subject to any disclaimer, the term of this patent is extended or adjusted under 35 U.S.C. 154(b) by 0 days.

(21) Appl. No.: 11/360,531

(22) Filed: Feb. 24, 2006

(51) Int. Cl.
*A01C 7/00* (2006.01)
*A01C 9/00* (2006.01)

(52) U.S. Cl. .................. 111/174; 111/904; 111/922

(58) Field of Classification Search ........ 111/174–176, 111/170, 179, 903, 904, 200, 921, 922; 239/463–465, 239/71, 74

See application file for complete search history.

(56) References Cited

U.S. PATENT DOCUMENTS

| | | |
|---|---|---|
| 5,301,848 A | 4/1994 | Conrad |
| 5,524,794 A | 6/1996 | Conrad |
| 5,539,870 A | 7/1996 | Conrad et al. |
| 5,638,285 A | 6/1997 | Conrad |
| 5,641,011 A | 6/1997 | Conrad |
| 5,687,782 A | 11/1997 | Cleveland et al. |
| 5,737,536 A | 4/1998 | Herrmann et al. |
| 6,938,564 B2 | 9/2005 | Conrad |

Primary Examiner—Christopher J. Novosad
(74) Attorney, Agent, or Firm—McDermott Will & Emery LLP

(57) ABSTRACT

A self-calibrating metering system for dispensing chemical granules. The system incorporates a flow sensor configured to sense a greater flow rate at the inlet aperture than at the outlet aperture. Further included is an adjustment mechanism configured to adjust the flow rate of the meter so as to calibrate the meter according to a known flow rate through a calibrated orifice within the meter. An electromechanical solenoid may be energized by a subcontroller operably coupled to the metering apparatus to allow chemical granules to flow by gravity from the pesticide container that may be disposed above the metering apparatus. The metering apparatus may be disposed on a planter unit designed to deposit granular materials with seed during the planting process. The metering system further includes an in-meter diffuser that receives foreign material and lumps in order to prevent the metering apparatus from becoming clogged.

24 Claims, 6 Drawing Sheets

US 7,171,913 B1

SELF-CALIBRATING METER WITH IN-METER DIFFUSER

BACKGROUND

1. Field

The present disclosure relates to metering devices and, more particularly, to self-calibrating meters for dispensing insecticides.

2. Description of Related Art

In markets requiring the usage of chemicals, which are often hazardous substances, the Environmental Protection Agency and other regulatory bodies are imposing stricter regulations on the transportation, handling, dispersion, disposal, and reporting of actual usage of chemicals. These regulations, along with public health concerns, have generated a need for products that deal with proper chemical handling. Planting and chemical granular dispensing systems for dispensing insecticides, herbicides, fungicides, and/or fertilizers, have made the handling of seed and chemical granules less hazardous to the agricultural worker.

Research has indicated that it is inefficient to use the conventional method of dispensing chemical granules, in which chemical granules are dispersed over an entire length of the seed furrow in which seed is planted. Instead, dispensing smaller amounts of the chemical granules of insecticides and other pesticides in close proximity to the seed not only obtains the desired effect of eliminating insects or pests, but also reduces the amount of chemical agent that is used to obtain such an effect. As such, the result is more cost effective, environmentally friendly, and less hazardous, while maintaining the desired effect of the chemical granules.

To reduce the quantity of chemicals handled, the concentration of the chemical, as applied, has been increasing. This has raised the cost of chemicals per unit weight and has also required more accurate dispensing systems. For example, typical existing systems for agricultural pesticide dispensing may use a mechanical chain driven dispenser. Normal wear and tear on these mechanical dispensers can alter the rate of pesticide applied by as much as 15%. For at least one typical chemical that is commonly used, Force.RTM., a pyrethroid type insecticide by ICI, an over-application rate of 15% can increase the cost of the insecticide by $750 over 500 acres.

Current metering devices may incorporate coil diffusers. These coil diffusers may become plugged with foreign material and lumps and may interfere with the operation of meter and/or its parts.

There is a need for a meter that permits an easy way to calibrate so that the proper amount of material or pesticides may be delivered through the meter.

There is further a need for a meter that is capable of providing protection from foreign material and lumps that might plug the meter, thereby causing the meter to malfunction.

BRIEF SUMMARY

The present disclosure addresses the foregoing deficiencies of the prior art by providing a self-calibrating meter having an in-meter diffuser for removing foreign material and lumps.

In accordance with one embodiment of the present disclosure, a system is for dispensing chemical granules. The system comprises a self-calibrating metering apparatus that includes a housing having an inlet aperture and an outlet aperture, a calibrated orifice disposed within the outlet aperture, a flow sensor configured to sense a greater flow rate at the inlet aperture than at the outlet aperture; and an adjustment mechanism configured to adjust the flow rate of the meter.

In accordance with another embodiment of the present disclosure, a system is for dispensing chemical granules. The system comprises a self-calibrating metering apparatus that includes a housing having an inlet aperture and an outlet aperture. The metering apparatus of the system further includes a container mounted on said housing and including a bottom wall having an outlet aperture, the container being disposed with a supply of substantially fluent material and having its outlet aperture in fluid communication with the inlet aperture of said housing. The metering apparatus also includes an electromechanical solenoid attached to the container, a calibrated orifice disposed within the outlet aperture, a flow sensor configured to sense a greater flow rate at the inlet aperture than at the outlet aperture, and an adjustment mechanism configured to adjust the flow rate of the meter.

These, as well as other objects, features and benefits will now become clear from a review of the following detailed description of illustrative embodiments and the accompanying drawings.

DETAILED DESCRIPTION OF ILLUSTRATIVE EMBODIMENTS

The present disclosure is directed to a self-calibrating meter for dispensing chemical granules, including pesticides. The meter incorporates an in-meter diffuser for passing foreign materials and lumps so that foreign materials and lumps do not plug the meter.

Figure 1A:
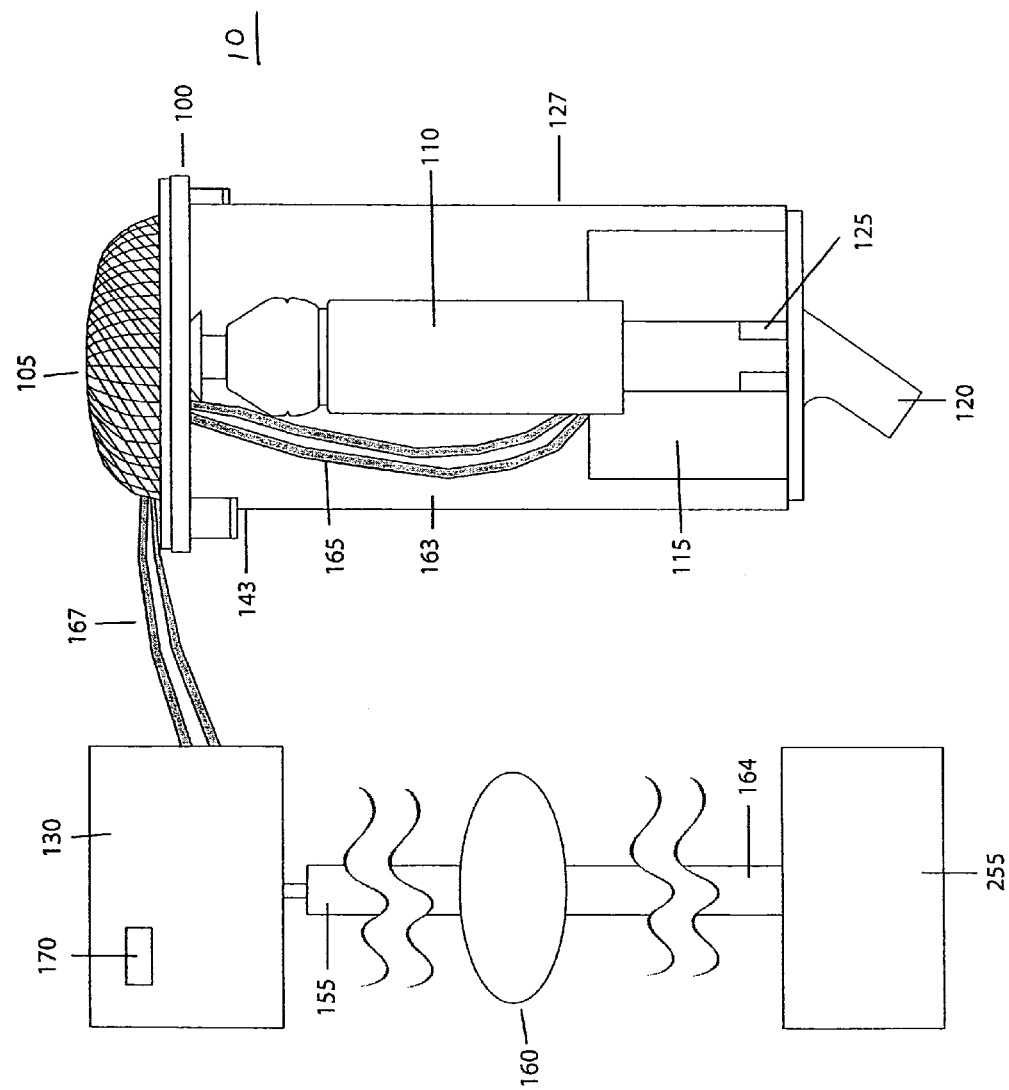
FIGS. 1A–1C illustrate a metering apparatus and in-meter diffuser in accordance with one embodiment of the present disclosure.

Referring now to FIG. 1A, illustrated is a side view of a metering apparatus for dispensing chemical granules in accordance with one embodiment of the present disclosure. The metering apparatus 10, for use with a pesticide container, includes a top orifice plate 100 that may be fastened to the bottom of a pesticide container. Just above the top orifice plate 100 may be disposed a screen for screening granular materials to be passed through the metering apparatus 10. Disposed through top orifice plate 100 may be an inlet aperture that permits the introduction of chemical granules from the pesticide container into the metering apparatus 10.

The metering apparatus 10 may be electromechanical and may be attached to the top orifice plate 100. The metering apparatus 10 may incorporate an electric solenoid 110. The solenoid 110 may be in contact with a flow sensor 115 or other sensing unit which is, in turn, coupled to outlet aperture 120.

Outlet aperture 120 includes, disposed therein, a calibrated orifice 125. The maximum flow rating for specified chemicals will be known, and the flow rating through the calibrated orifice 125 will reflect the maximum flow rating for such materials. When the metering apparatus 10 has material entering its top orifice plate 100 faster than the maximum flow rating for a particular material, the material tends to back up at the outlet aperture 120 and/or calibrated orifice 125 and set off the flow sensor 115.

By using the controller rate adjustment, the operator may increase the flow rate of the material through the metering apparatus 10 until the flow sensor 115 signals the controller that the material has built up on the flow sensor orifice. The operator than compares the flow rate from the controller to the maximum flow rate for the orifice. The controller calibration mode may list the calibration number for each meter. The operator may then adjust the calibration number for the metering apparatus 10 so the controller flow rate agrees with the orifice flow rate. The adjustment may also be done manually in ways known to an ordinary skilled artisan. If the memory in the controller for the metering apparatus 10 is sufficiently large, the controller may be able to check calibration during the planting process, i.e., the process of depositing seed into the furrow.

Operator access to the calibrated orifice 125 may be desired. In this connection, the bottom of the metering apparatus 10 may have a connector on the flow sensor 115 removed. The connector may be bolted over the flow sensor 115 with four mounting bolts. The calibrated orifice 125 may be disposed on top of the connector and may be changed easily by removing the four bolts.

The meter screen 105 should be as small as possible to prevent plugging of the calibrated orifice 125.

The solenoid 110 may be energized by a subcontroller 255 operably coupled to the metering apparatus 10 to allow pesticide to flow by gravity from the pesticide container that may be disposed above the metering apparatus 10 or any other desired location that would permit the metering apparatus 10 to be calibrated in accordance with the present disclosure. The solenoid may be electrically connected to a motherboard 143 which is, in turn, connected to an electronic memory circuit 130.

It may be desirable to seal the solenoid 110 from the pesticide or other chemical granules that may be introduced into the metering apparatus. Pesticide entering the solenoid 110 could cause premature failure of the solenoid 110. The solenoid 110 may be sealed by a cover (not shown) to prevent entry of pesticide or other chemical granules into the solenoid 110.

An electronic memory circuit 130 may be connected to the motherboard. A multi-conductor cable 155, connector 160 and cable or connector 164 may be used to connect the electronic memory circuit 130 to a subcontroller 255 for the solenoid 110 and/or metering apparatus 10. In accordance with one embodiment of the present disclosure, the subcontroller may directly apply electrical power to the solenoid 110 through power wires 165. In addition to connecting the subcontroller solenoid power to the solenoid 110, the electronic memory circuit 130 may also include a non-volatile memory device 170. The memory device 170 may be an E PROM, a non-volatile memory device that is electrically erasable programmable memory, also referred to as EEPROM or E.sup.2 PROM. The flow sensor 115 may also be electrically connected to the motherboard 143 via wire 163.

The combination of the electronic memory 170 and the pesticide container with attached metering device 10 may create a material container capable of electronically remembering and storing data important to the container, the material dispensing system, and the pesticide. Among the data which could be stored are: a serial number unique to that container, pesticide lot number, type of pesticide, metering calibration, date of filling, quantity of material in the container, quantity of material dispensed including specific rates of application, fields treated. This stored data can be recalled and updated as needed. The stored data can also be used by a metering controller or pumping system by accessing specific calibration numbers unique to the container and make needed adjustments, by sounding alarms when reaching certain volume of pesticide in a container, or keeping track of usage of the container to allow scheduling of maintenance.

Figure 1B:
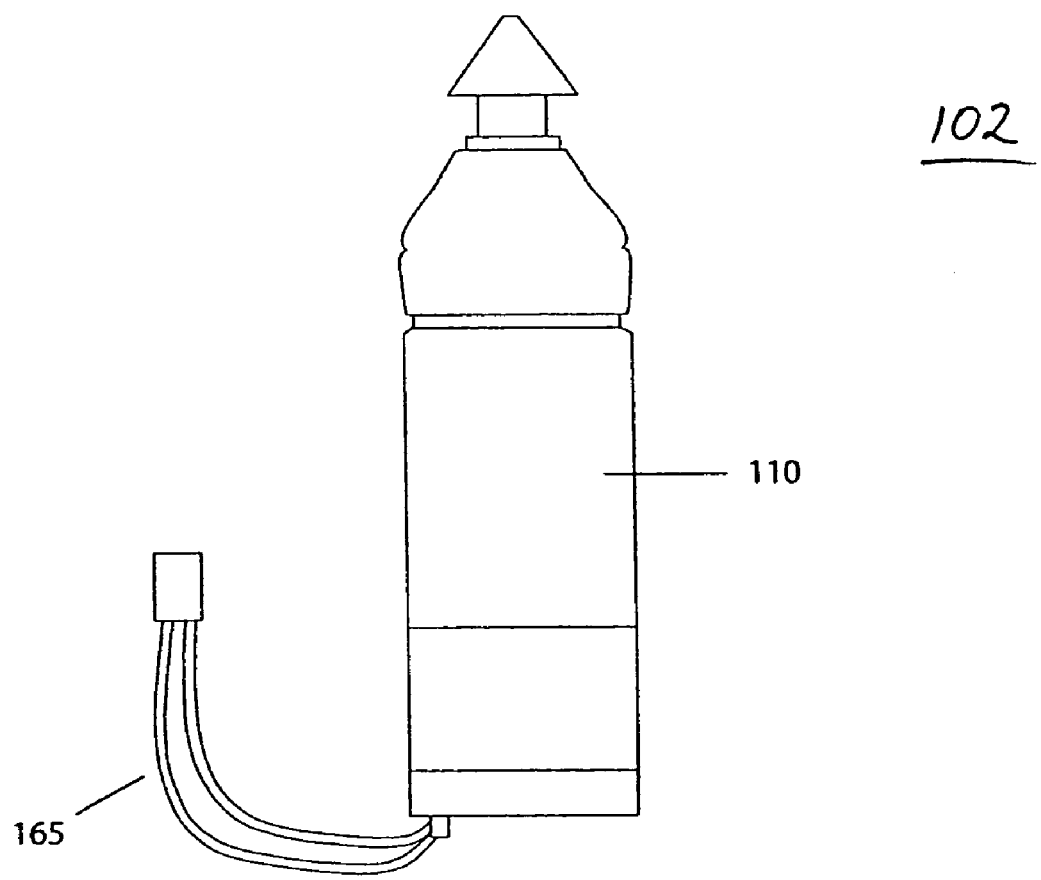
Figure 1B:
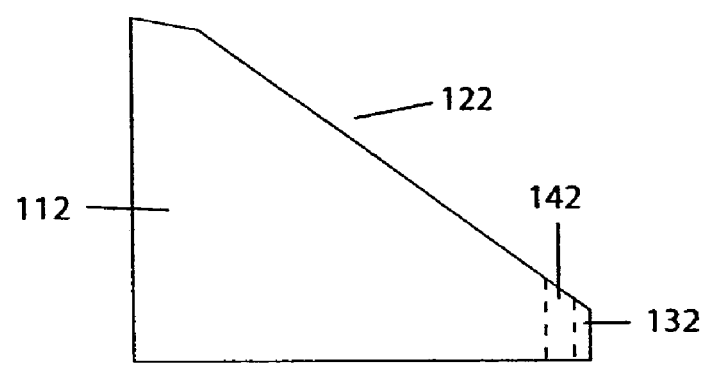

The metering apparatus 10 may also include an in-meter diffuser configured to be wrapped around solenoid 110 within meter housing 127. Referring now to FIG. 1B, illustrated is an in-meter diffuser 102 in accordance with one embodiment of the present disclosure. The in-meter diffuser 102 includes a main body 112 having sloped sides 122, a level lower portion 132, orifices 142. The slope sides 122 are cut to about a 45 degree angle. The level lower portion 132 has orifices configured to surround the solenoid of a metering apparatus. During operation, the chemical granules or other material flow down the main body 112 of the diffuser 102 and out of orifices 142. Foreign material and lumps may pass over the metering holes and into an overflow space.

Figure 1C:
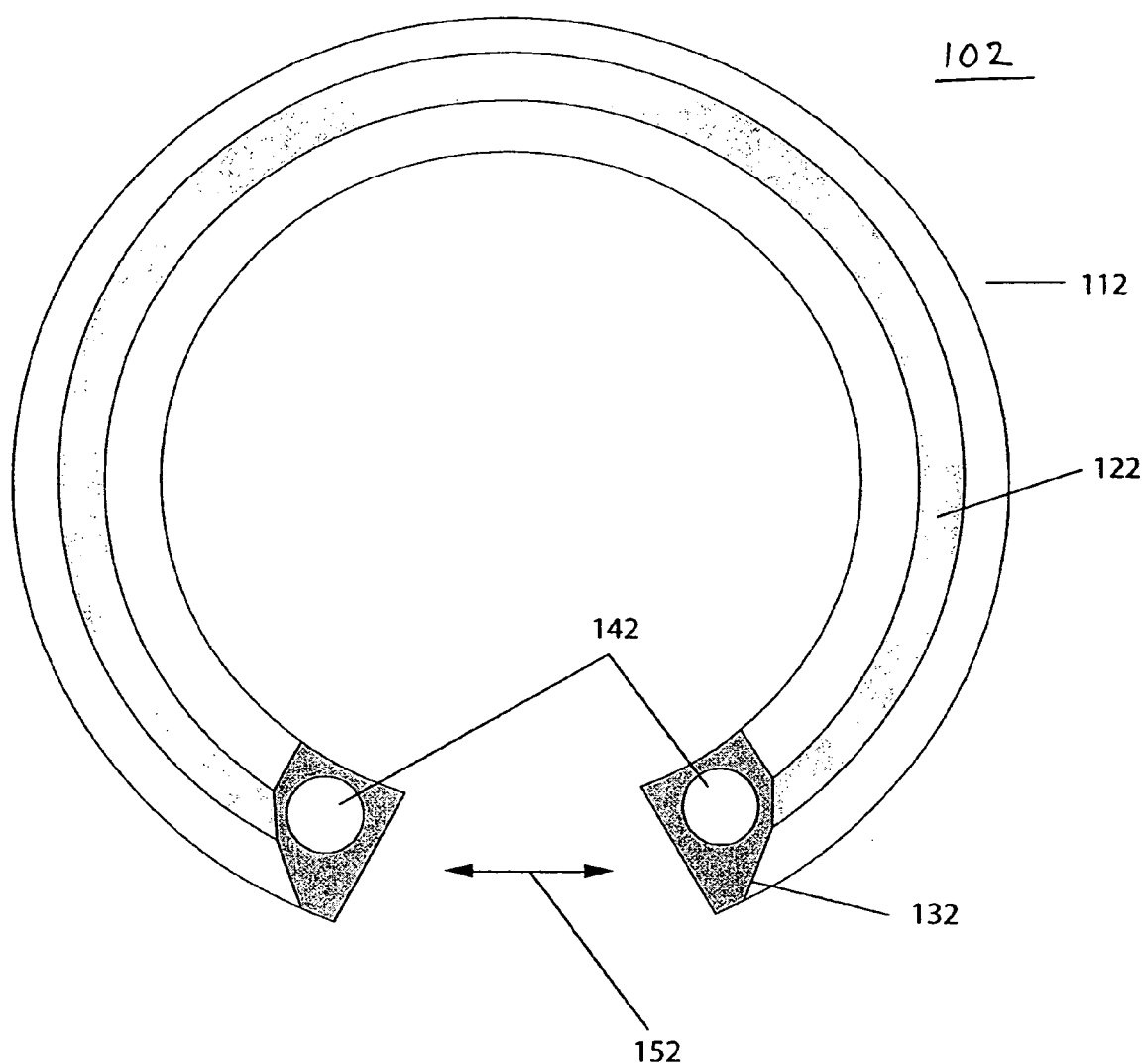

Referring now to FIG. 1C, illustrated is a top view of the in-meter diffuser 102 shown in FIG. 1B. As illustrated, the main body 112 includes two orifices 142 for receiving chemical granules. The in-meter diffuser 102 also includes an overflow space 152. Overflow space 152 is used to capture high rate flow, lumps and foreign material.

Figure 2:
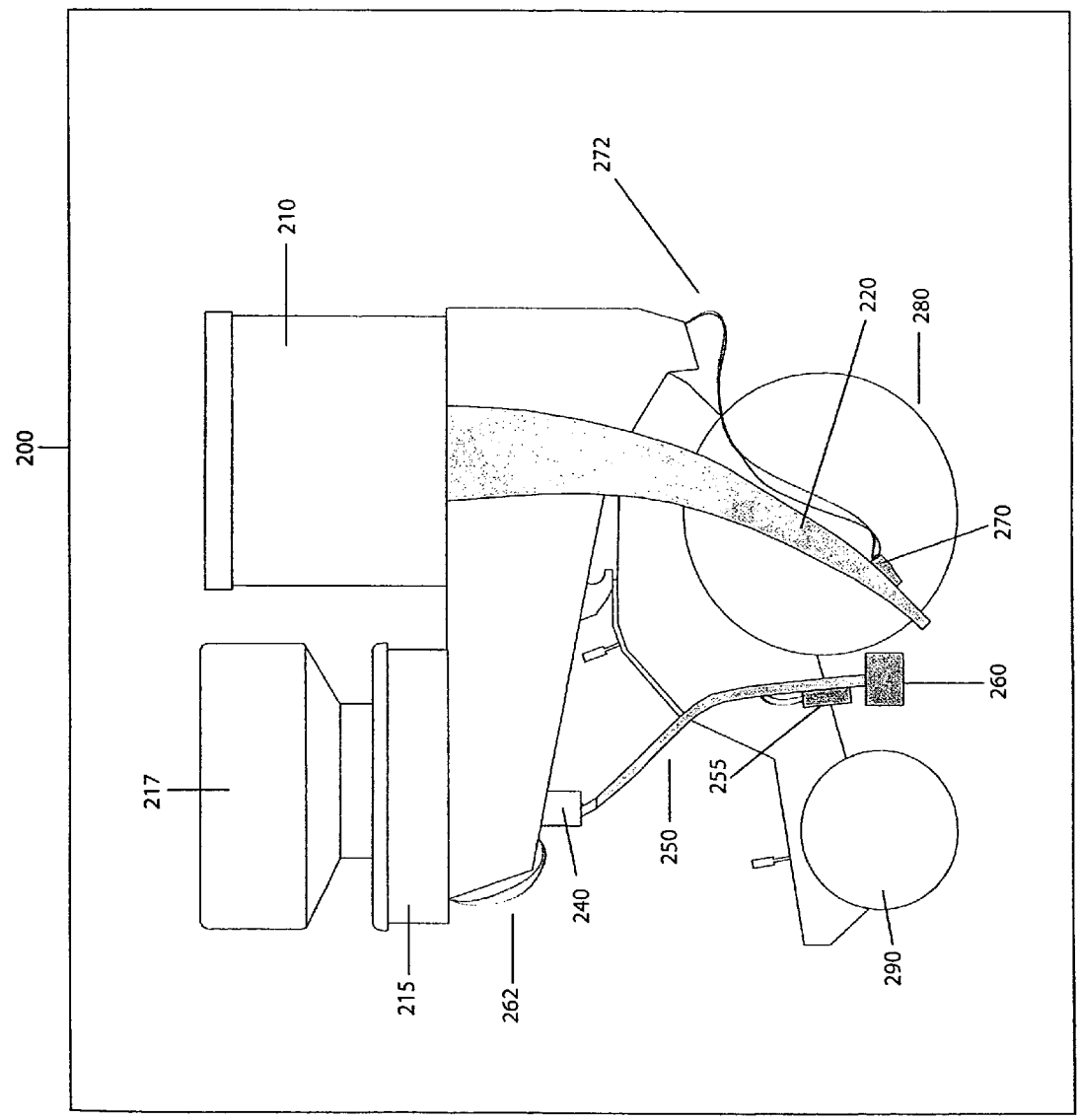
FIG. 2 is a perspective view of a chemical granule dispensing system in accordance with one embodiment of the present disclosure.

Referring now to FIG. 2, illustrated is a view of the seed and chemical granule dispensing system in accordance with one embodiment of the present disclosure. Although FIG. 2 shows one such system 200, it should be understood that typical planters may include multiple systems, e.g., twenty-four (24) of such systems. As shown in FIG. 2, the system 200 includes seed hopper 210 and granule storage hopper 215. At the bottom of seed hopper 210 may be a seed dispensing tube 220 into which seeds may be dispatched from seed hopper 210 in a metered fashion.

A meter may be built into the bottom of seed hopper 210 that turns to dispense seed. The manner in which the seed may be metered or dispensed is similar to the method disclosed in U.S. Pat. No. 5,301,848, which is incorporated herein by reference. Alternatively, a gate or door may be used in the meter's stead to electronically open and close to allow a single seed to be deposited in a seed furrow.

Granule storage hopper 215 has a discharge opening (not shown) which is connected to chemical tube 250. Granule storage hopper 215 includes a pulsing electrical valve 260 and/or a gate or door which opens or closes in order to permit the flow of chemical granules. Furrow opening wheel 280 may be used to open a furrow into which the seeds and chemical granules are dispensed. Furrow closing wheel 290 may be used to close a furrow into which the seeds and chemical granules are dispensed.

Chemical granules may be a substantially fluent material and may be held within chemical tube 250. Chemical granules may not be dispensed until a seed drops through seed dispensing tube 220.

The granule storage hopper 215 may include a "Smart Box" mechanism that automatically adjusts the quantity of chemical granules that are dispensed along with the seeds, taking into account changes in speed of the planting. The subcontroller 255 may be used to adjust the quantity of chemical granules that are dispensed along with the seed. The subcontroller 255 may be operably coupled via an electrical connection to the radar of the vehicle or tractor that is used to move the system 200 around a field in which seeds and chemicals are to be dispensed. The "Smart Box" mechanism is generally described in U.S. Pat. No. 5,737,221, which is incorporated by reference herein.

The Smart Box mechanism may be used to accomplish a desired chemical granule dispensing rate, taking into account both the ground speed of the vehicle used to dispense the chemical granules and calibration data associated with the metering of the granule hopper 215. After the proximity sensor 270 or other seed sensing unit senses the presence of a seed, the Smart Box metering mechanism 217 may control the amount of chemical granule that is dispensed with each seed. For example, the metering mechanism 217 could be controlled to allow for a certain number of milligrams of chemical per seed. Alternatively, the metering mechanism may be configured to permit a specified quantity in terms of pounds per acre of chemical granules to be dispensed along with the seed. The electronic pulsing valve 260 determines when this amount should be dispensed.

Figure 3:
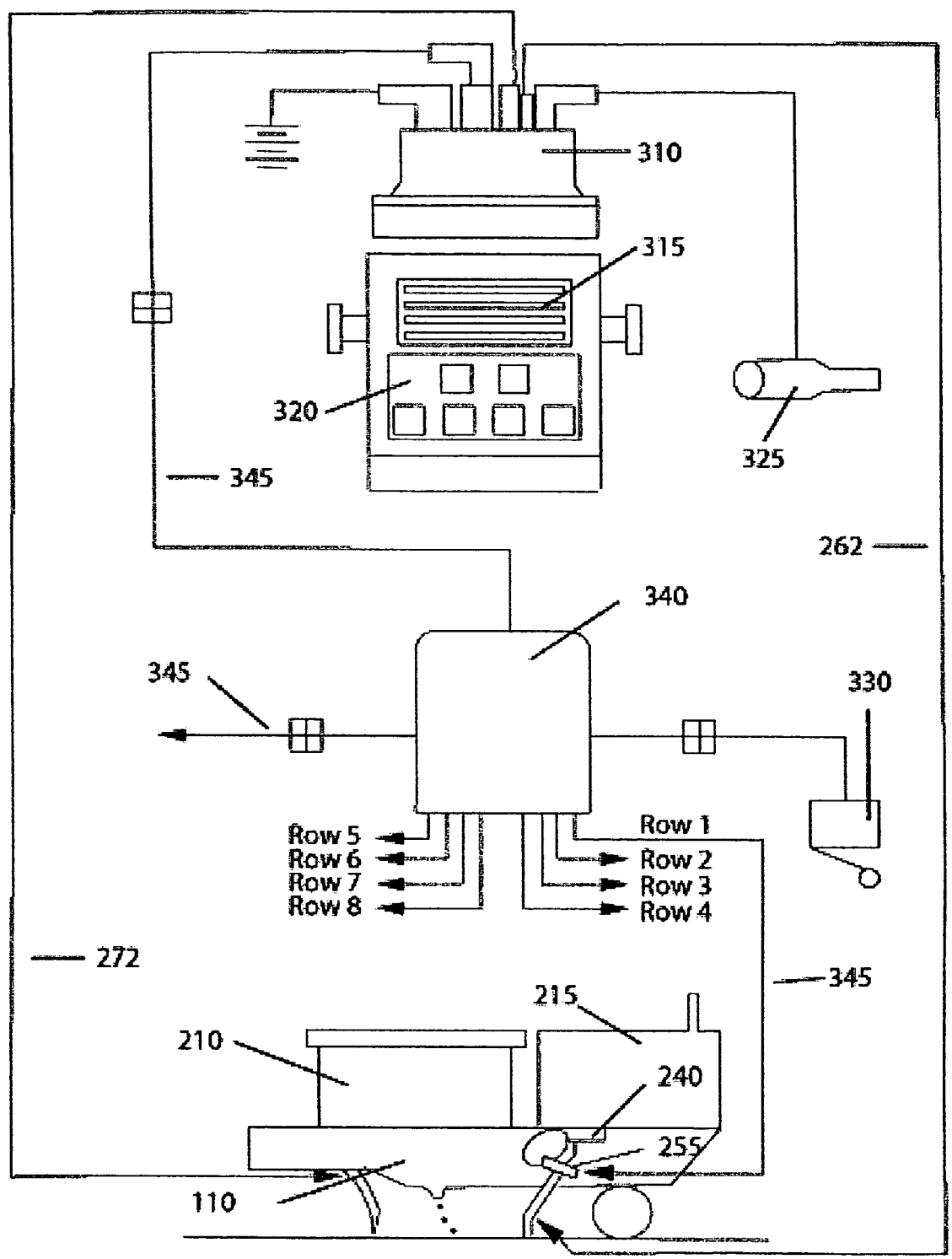
FIG. 3 is a view of a seed and chemical granule dispensing system in accordance with one embodiment of the present disclosure.

Referring now to FIG. 3, the Smart Box mechanism may be incorporated within a distributed control system that includes a main control unit 310 such as a microcontroller having a display 315 and keypad 320 for operator interface. A radar 325 or other speed sensing unit may be connected to the main control unit 310 to provide ground speed. Ground speed may be used to modify the material dispensing rate to account for the planter's speed. The main control unit 310 may be connected to a junction box 340 by a high speed serial communications link 345. The main control unit 310 may be in constant communication through the serial communications link 345 to a subcontroller 255 located on a planter such as that shown in FIG. 2.

The subcontrollers on the planters may allow a method of multiplexing signals going to the main control unit 310. The main control unit 310 may control a 24-row planter with only nine wires going to a junction box 340. One pair of wires may be used for serial communications, three pairs of wires may be used to power the subcontroller 255 and metering device 10. One wire may be provided for the lift switch 330. Three pairs of wires may be used to more evenly distribute the current requirements.

The main control unit 310 may also contain a non-volatile memory unit, typically known as "flash" memory. Information pertaining to the usage and application of pesticides is stored in this nonvolatile memory unit.

The junction box 340 may be connected by additional portions of the serial communications link 345 to a plurality of subcontroller units. Each subcontroller unit 255 may be associated with one row of the planter. The junction box 340 may connect up to eight row control units to the main control unit 310. If the planter has more than eight rows, additional junction boxes may be connected in series to the first junction box 340. A lift switch 330 may be connected to the first junction box 340. The lift switch 330 may indicate when the planter is not in an operating position. Other interfaces to the main control unit 310 may be provided such as serial or parallel links for transmitting information to other computer systems or printers. As shown, the proximity sensor communication link 272 and valve communication link 262 are also interfaced with main control unit 310.

The subcontroller 255 may have memory devices and logic devices within to modify and implement the commands from the main control unit 310. The subcontroller 255 may read information from a container memory circuit (e.g., item 130 shown in FIG. 1A) attached to the granule storage hopper 215 and manipulate the commands from the main control unit 310 to properly operate the metering device 10. For example, if the concentration of pesticide on a first row is different from the concentration of pesticide on a second row, the subcontroller 255 can modify the commands of the main control unit 310 to properly dispense pesticides from all rows. The subcontroller 255 may also read metering device 10 calibration data from the container memory circuit 130 and modify the main control unit 310 commands to account for differences in performance of different metering devices.

The subcontroller 255 may allow the operator of the cab to completely change the programmed functions of the main control unit 310. For example, if a pre-programmed subcontroller 255 were placed on a liquid herbicide sprayer, the main control unit 310 might be able to read the dispenser type information and operate as a liquid sprayer controller.

In the illustrated figures, one subcontroller 255 is used to control one metering device and memory unit 130. It should be understood, however, that a subcontroller 255 may control multiple devices, for example, two metering device and memory units 130 or one metering device and memory unit 130 and one seed hopper and seed planting mechanism.

Figure 4:
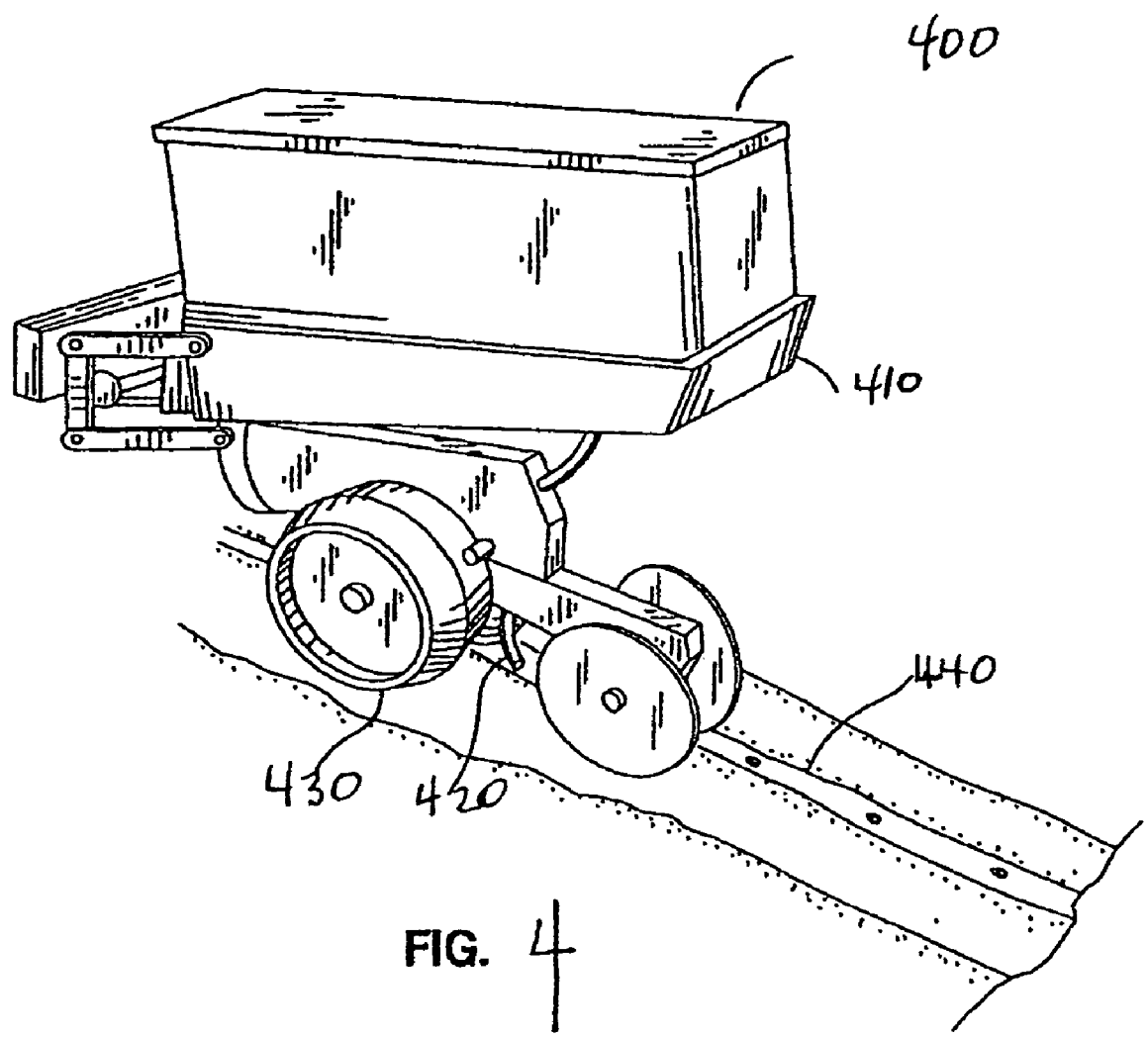
FIG. 4 is a distributed control system used to control the operation of the self-calibrating meter in accordance with one embodiment of the present disclosure.

FIG. 4 is a perspective view of a chemical granule dispensing system in accordance with one embodiment of the present disclosure. More specifically, system 400 includes a seed compartment and a granule storage compartment for holding insecticide or other pesticides. System 400 may be disposed on top of planter unit 410, and may be removable from planter unit 410. As such, system 400 can be returned to the seed and insecticide distributor for refilling.

Planter unit 410 may follow behind a seed trenching unit (not shown) or may include a seed trenching unit (not shown). In either case, a seed furrow 440 is trenched in the soil. The seed and the chemical granules may be passed through a seed dispensing tube of planter unit 410, which includes an output 420 immediately before disking wheels 430. Disking wheels 430 turn the soil to cover seed furrow 440 which includes the dispensed seed and chemical granules.

While the specification describes particular embodiments of the present invention, those of ordinary skill can devise variations of the present invention without departing from the inventive concept.

I claim:

1. A system for dispensing chemical granules, the system comprising:
   a self-calibrating metering apparatus, including:
      a housing having an inlet aperture and an outlet aperture;
      a calibrated orifice disposed within the outlet aperture;
      a flow sensor configured to sense a greater flow rate at the inlet aperture than at the outlet aperture; and
      an adjustment mechanism configured to adjust the flow rate of the meter.

2. The system of claim 1, further comprising:
   a chemical granule metering system configured to distribute a particular quantity of chemical granules with the seeds, according to the ground speed of a vehicle incorporating the system.

3. The system of claim 2, wherein the ground speed of the vehicle is detected by a speed sensing unit on the vehicle.

4. The system of claim 1, further comprising:
a seed dispensing tube configured to dispense seeds; and
a seed sensing unit operably coupled to the seed dispensing tube, wherein the seed sensing unit is configured to sense dispensation of a seed from the seed dispensing tube.

5. The system of claim 4, further comprising:
a seed storage hopper coupled to the seed dispensing tube, the seed storage hopper being configured to store seeds.

6. The system of claim 1, wherein the container is a granule storage hopper configured to store chemical granules.

7. The system of claim 1, wherein the adjustment mechanism automatically adjusts without human intervention.

8. The system of claim 1, wherein the adjustment mechanism is manual such that it is adjusted by an operator of a vehicle.

9. The system of claim 1, further comprising:
an in-meter diffuser configured to prevent the metering apparatus from becoming plugged.

10. The system of claim 9, wherein the in-meter diffuser includes:
a main body having a substantially circular cross-section, the main body further having sloped sides configured to receive a flow of chemical granules, the sloped sides terminating at a level lower portion configured to collect chemical granules; and
orifices disposed within the main body, the orifices being configured to regulate the flow of chemical granules.

11. The system of claim 10, wherein the substantially circular cross-section has an overflow opening configured to receive foreign material and lumps.

12. The system of claim 10, further comprising:
an electromechanical solenoid; and
wherein the in-meter diffuser is configured to wrap around the electromechanical solenoid.

13. A self-calibrating metering system for dispensing chemical granules, the system comprising:
a self-calibrating metering apparatus, including:
a housing having an inlet aperture and an outlet aperture;
a container mounted on said housing and including a bottom wall having an outlet aperture, the container being disposed with a supply of substantially fluent material and having its outlet aperture in fluid communication with the inlet aperture of said housing;
an electromechanical solenoid attached to the container;
a calibrated orifice disposed within the outlet aperture;
a flow sensor configured to sense a greater flow rate at the inlet aperture than at the outlet aperture; and
an adjustment mechanism configured to adjust the flow rate of the meter.

14. The system of claim 13, further comprising:
a chemical granule metering system configured to distribute a particular quantity of chemical granules with the seeds, according to the ground speed of a vehicle incorporating the system.

15. The system of claim 14, wherein the ground speed of the vehicle is detected by a speed sensing unit on the vehicle.

16. The system of claim 13, further comprising:
a seed dispensing tube configured to dispense seeds; and
a seed sensing unit operably coupled to the seed dispensing tube, wherein the seed sensing unit is configured to sense dispensation of a seed from the seed dispensing tube.

17. The system of claim 16, further comprising:
a seed storage hopper coupled to the seed dispensing tube, the seed storage hopper being configured to store seeds.

18. The system of claim 13, wherein the container is a granule storage hopper configured to store chemical granules.

19. The system of claim 13, wherein the adjustment mechanism automatically adjusts without human intervention.

20. The system of claim 13, wherein the adjustment mechanism is manual such that it is adjusted by an operator of a vehicle.

21. The system of claim 13, further comprising:
an in-meter diffuser configured to prevent the metering apparatus from becoming plugged.

22. The system of claim 21, wherein the in-meter diffuser includes:
a main body having a substantially circular cross-section, the main body further having sloped sides configured to receive a flow of chemical granules, the sloped sides terminating at a level lower portion configured to collect chemical granules; and
orifices disposed within the main body, the orifices being configured to regulate the flow of chemical granules.

23. The system of claim 22, wherein the substantially circular cross-section has an overflow opening configured to receive foreign material and lumps.

24. The system of claim 22, wherein the in-meter diffuser is configured to wrap around the electromechanical solenoid.

* * * * *

UNITED STATES PATENT AND TRADEMARK OFFICE
CERTIFICATE OF CORRECTION

PATENT NO. : 7,171,913 B1 Page 1 of 1
APPLICATION NO. : 11/360531
DATED : February 6, 2007
INVENTOR(S) : Larry Conrad It is certified that error appears in the above-identified patent and that said Letters Patent is hereby corrected as shown below:

On The Title Page Item -56-

"U.S. PATENT DOCUMENTS
5301848  April 1994 Conrad
5524794  June 1996 Conrad
5539870  July 1996 Conrad et al.
5638285  June 1997 Conrad
5641011  June 1997 Conrad
5687782  November 1997 Cleveland et al.
5737536  April 1998 Herrmann et al.
6938564  September 2005 Conrad"

should read

-- U.S. PATENT DOCUMENTS
5301848  April 1994 Conrad, et al.
5524794  June 1996 Benedetti, Jr., et al.
5539669  July 1996 Goeckner, et al.
5638285  June 1997 Newton
5641011  June 1997 Benedetti, Jr., et al.
5687782  November 1997 Cleveland, et al.
5737221  April 1998 Newton
6938564  September 2005 Conrad, et al. --.

Signed and Sealed this

Third Day of June, 2008

JON W. DUDAS
*Director of the United States Patent and Trademark Office*